United States Patent
van der Zee et al.

(10) Patent No.: US 12,219,379 B2
(45) Date of Patent: Feb. 4, 2025

(54) RELAXED INTER-FREQUENCY MEASUREMENTS

(71) Applicant: Telefonaktiebolaget LM Ericsson (publ), Stockholm (SE)

(72) Inventors: Martin van der Zee, Malmö (SE); Ali Nader, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 551 days.

(21) Appl. No.: 17/608,379

(22) PCT Filed: May 1, 2020

(86) PCT No.: PCT/IB2020/054156
§ 371 (c)(1),
(2) Date: Nov. 2, 2021

(87) PCT Pub. No.: WO2020/222200
PCT Pub. Date: Nov. 5, 2020

(65) Prior Publication Data
US 2022/0217564 A1  Jul. 7, 2022

Related U.S. Application Data

(60) Provisional application No. 62/842,091, filed on May 2, 2019.

(51) Int. Cl.
*H04W 24/10* (2009.01)
*H04W 24/02* (2009.01)

(52) U.S. Cl.
CPC .......... *H04W 24/10* (2013.01); *H04W 24/02* (2013.01)

(58) Field of Classification Search
CPC . H04W 24/10; H04W 24/02; H04W 52/0216; H04W 52/0241; H04W 52/0251;
(Continued)

(56) References Cited

U.S. PATENT DOCUMENTS

2014/0362716 A1* 12/2014 Zhang ................... H04W 24/10
370/252
2015/0139053 A1*  5/2015 Van Lieshout ... H04W 52/0209
370/311
(Continued)

FOREIGN PATENT DOCUMENTS

| EP | 2779745 A1 | 9/2014 |
|----|------------|--------|
| WO | 2014162061 A1 | 10/2014 |
| WO | 2015123405 A1 | 4/2015 |

OTHER PUBLICATIONS

NTT Docomo, Inc., "R1-1902793: SSB/RMSI periodicity for IAB initial access," 3GPP TSG RAN WG1 #96, Feb. 25-Mar. 1, 2019, 5 pages.
(Continued)

*Primary Examiner* — Anh Ngoc M Nguyen
(74) *Attorney, Agent, or Firm* — Withrow & Terranova, PLLC

(57) ABSTRACT

Systems and methods for relaxed inter-frequency measurements are provided. In some embodiments, a method performed by a wireless device for relaxing inter-frequency measurements includes receiving an indication that frequencies should have relaxed inter-frequency measurements; and relaxing the inter-frequency measurements for the indicated frequencies. In this way, in some embodiments, the wireless device relaxes measurements on that frequency only when the network indicates that relaxed measurements may be applied to the inter-frequency. This implies that legacy measurement performance and mobility is retained. The measurements can be relaxed when the network is aware of spotty coverage on certain frequencies. Furthermore, the network has explicit control over the relaxation, e.g., the network can indicate how much the measurements may be relaxed, i.e., there can be a guarantee for a minimum measurement performance. The wireless device can revert to
(Continued)

legacy measurement requirements when a suitable cell is detected or cell re-selection is performed.

26 Claims, 12 Drawing Sheets

(58) Field of Classification Search
CPC . H04W 52/0274; H04W 84/10; H04W 88/06; H04W 48/16; Y02D 30/70
See application file for complete search history.

(56) References Cited

U.S. PATENT DOCUMENTS

| | | | |
|---|---|---|---|
| 2015/0146595 A1* | 5/2015 | Jamadagni | H04W 52/0235 370/311 |
| 2016/0112149 A1 | 4/2016 | Kim et al. | |
| 2017/0006510 A1* | 1/2017 | Kaikkonen | H04W 48/16 |
| 2018/0332532 A1 | 11/2018 | Johansson et al. | |
| 2018/0352513 A1 | 12/2018 | Jamadagni et al. | |
| 2018/0359149 A1* | 12/2018 | Shaheen | H04W 72/0453 |

OTHER PUBLICATIONS

Notice of Reasons for Refusal for Japanese Patent Application No. 2021-564887, mailed Dec. 2, 2022, 6 pages.
Author Unkown, "Technical Specification Group Radio Access Network; NR; Requirements for support of radio resource management (Release 15)," Technical Specification 38.133, Version 15.5.0, 3GPP Organizational Partners, Mar. 2019, 892 pages.
Author Unkown, "Technical Specification Group Radio Access Network; NR; User Equipment (UE) procedures in Idle mode and RRC Inactive state (Release 15)," Technical Specification 38.304, Version 15.3.0, 3GPP Organizational Partners, Mar. 2019, 29 pages.
Author Unkown, "Technical Specification Group Radio Access Network; NR; Radio Resource Control (RRC) protocol specification (Release 15)," Technical Specification 38.331, Version 15.5.1, 3GPP Organizational Partners, Apr. 2019, 491 pages.
Ericsson, "R2-1904153: Relaxed measurements in Idle and Inactive mode," Third Generation Partnership Project (3GPP), TSG-RAN2 Meeting #105bis, Apr. 8-12, 2019, 4 pages, Xi'an, China.
Ericsson (email rapporteur), "R2-1904155: Email report 105_56—RRM related aspects for power saving," Third Generation Partnership Project (3GPP), TSG-RAN2 Meeting #105bis, Apr. 8-12, 2019, 23 pages, Xi'an, China.
Ericsson, "R2-1906611: Relaxed inter-frequency measurements in spotty coverage," Third Generation Partnership Project (3GPP), TSG-RAN2 Meeting #106, May 13-17, 2019, 3 pages, Reno, USA.
Nokia Networks, et al., "5G RAN Design Workshop: A Novel State Model for 5G Radio Access Networks," International Conference on Communications (ICC), May 27, 2016, 8 slides, Kuala Lumpur.
OPPO, "R2-1905594: Higher priority frequency searching relaxes for UE power saving," Third Generation Partnership Project (3GPP), TSG-RAN2#106, Apr. 13-17, 2019, 3 pages, Reno, USA.
Sony, "R2-1901427: RRM measurements for UE power saving," Third Generation Partnership Project (3GPP), TSG RAN WG2 Meeting #105, Feb. 25-Mar. 2, 2019, 4 pages, Athens, Greece.
Sony, "R2-1904206: RRM measurements for UE power saving," Third Generation Partnership Project (3GPP), TSG RAN WG2 Meeting# 105bis, Apr. 8-12, 2019, 3 pages, Xian, China.
Vivo, "R1-1811962: Offline outcome of UE power Consumption Reduction in RRM Measurements," Third Generation Partnership Project (3GPP), Oct. 8-12, 2018, 6 pages, Chengdu, China.
International Search Report and Written Opinion for International Patent Application No. PCT/IB2020/054156, mailed Jul. 13, 2020, 17 pages.
Written Opinion for International Patent Application No. PCT/IB2020/054156, mailed Feb. 22, 2021, 6 pages.
International Preliminary Report on Patentability for International Patent Application No. PCT/IB2020/054156, mailed Jul. 16, 2021, 20 pages.
Office Action for Colombian Patent Application No. NC2021/0016436, mailed Aug. 6, 2024, 29 pages.

* cited by examiner

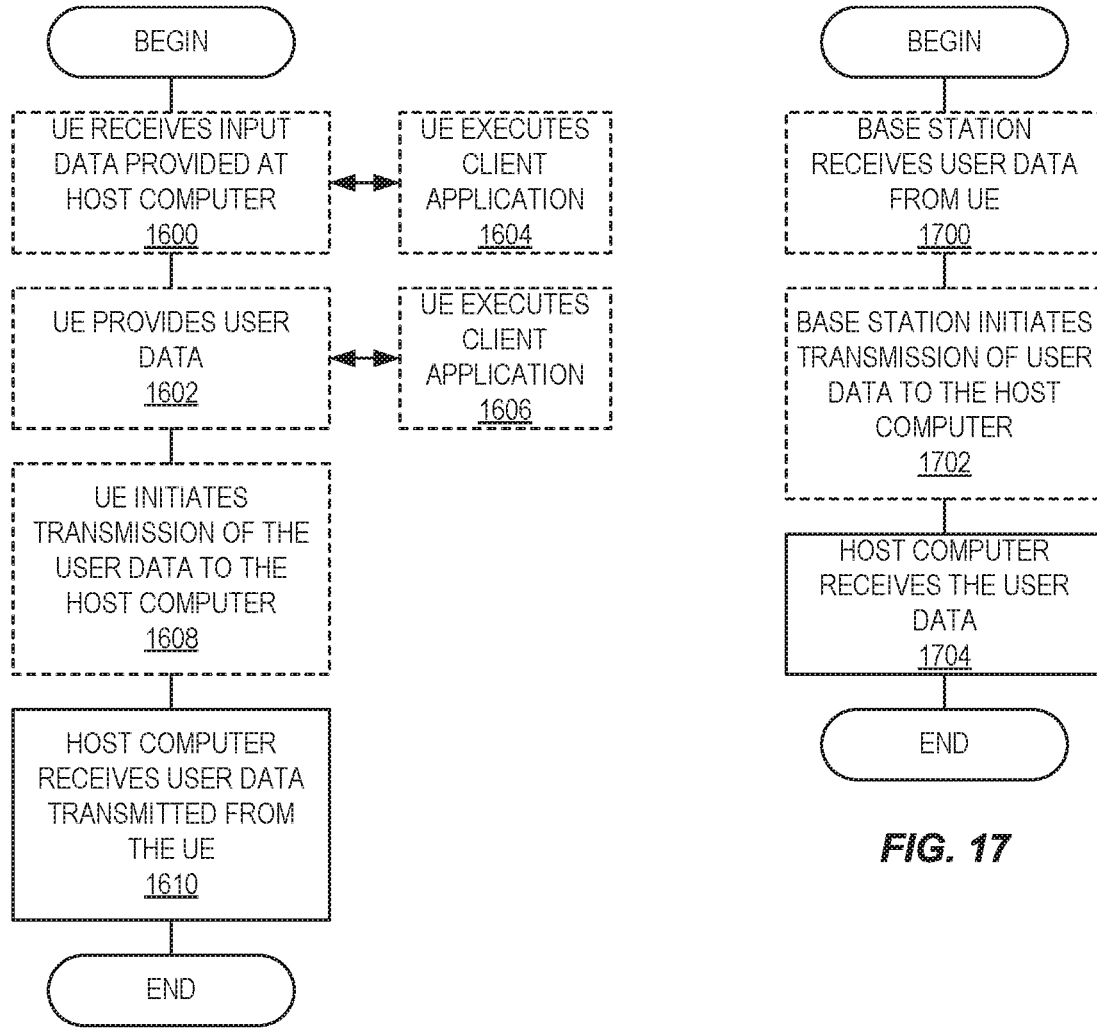

RELAXED INTER-FREQUENCY MEASUREMENTS

RELATED APPLICATIONS

This application is a 35 U.S.C. § 371 national phase filing of International Application No. PCT/IB2020/054156, filed May 1, 2020, which claims the benefit of provisional patent application Ser. No. 62/842,091, filed May 2, 2019, the disclosures of which are hereby incorporated herein by reference in their entireties.

TECHNICAL FIELD

The current disclosure relates to inter-frequency measurements.

BACKGROUND

New Radio (NR) standard in Third Generation Partnership Project (3GPP) is being designed to provide service for multiple use cases such as enhanced Mobile Broadband (eMBB), Ultra-Reliable and Low Latency Communication (URLLC), and Machine Type Communication (MTC). Each of these services has different technical requirements. For example, the general requirement for eMBB is high data rate with moderate latency and moderate coverage, while URLLC service requires a low latency and high reliability transmission but perhaps for moderate data rates.

On certain NR frequencies, there could be spotty coverage, e.g., in early deployment scenarios or when high capacity cells with small range are deployed at "hot spots." Spotty coverage can also include instances where the frequency does not provide full coverage, the frequency provides poor coverage, the frequency does not meet some quality threshold, etc. On frequencies providing spotty coverage, a User Equipment (UE) may thus spend unnecessary measurements to detect cells when there are known "holes" on the frequency. Furthermore, the UE may spend equal amount of effort on frequencies providing spotty and normal coverage.

When the UE is in Idle or Inactive mode, the UE is required to measure on the inter-frequencies indicated in system information when the serving cell quality is below the inter-frequency measurement threshold.

When the UE is in Connected mode, the UE is required to perform inter-frequency measurements on the frequencies indicated in the measurement configuration.

Typically inter-frequency measurements are triggered when:
1. The serving cell quality decreases and there is not suitable intra-frequency cell to re-select or handover to (i.e., current frequency does not provide full coverage).
2. There is a suitable cell on a higher priority frequency (priority based cell re-selection).
3. There is a much better cell than the serving cell on another frequency (equal priority based cell re-selection).

The UE can be configured to perform priority based inter-frequency cell re-selection in Idle mode, i.e., inter-frequencies are assigned a priority, and the UE tries to re-select to a higher priority frequency when possible. The UE is required to perform measurements for higher priority frequencies (in the background) at least every $T_{higher\_priority\_search} = ([60]*N_{layers})$ seconds, where $N_{layers}$ is the total number of higher priority NR frequencies broadcasted in system information (3GPP TS 38.133).

The UE can be configured to perform equal priority based cell re-selection. In such cases, the UE is required to perform inter-frequency measurements when the serving cell quality is below the inter-frequency measurement threshold ($S_{IntraSearchP}$ in 3GPP TS 38.304). When the UE is required to perform inter-frequency measurements, the UE performs those measurements when waking up from Discontinuous Reception (DRX) to listen to Paging in Idle mode.

In connected mode, the UE is required to perform inter-frequency measurements when configured via measurement configuration and when the serving cell is below the S-measure threshold (if configured). Typically, periodic measurement gaps are configured in Connected mode to enable the UE to measure on other NR frequencies. In the gap configuration (MeasGapConfig) there exist different gap patterns (gap offset, gap repetition period, measurement gap length).

Currently no distinction is made between spotty frequencies and frequencies providing full coverage; one of the reasons perhaps being that the network cannot guarantee that UE finds a suitable cell in all cases anyways. That is, in real and good deployment scenarios, there can always be problem areas. But based on the deployment scenario (e.g., early deployment or hot spots) the network may know in advance that full coverage on certain frequencies cannot be assumed. As such, improved systems and methods are needed.

SUMMARY

Systems and methods for relaxed inter-frequency measurements are provided. In some embodiments, a method performed by a wireless device for relaxing inter-frequency measurements includes receiving an indication that one or more frequencies should have relaxed inter-frequency measurements; and relaxing the inter-frequency measurements for the one or more indicated frequencies. In this way, in some embodiments, the wireless device relaxes measurements on that frequency only when the network indicates that relaxed measurements may be applied to the inter-frequency. This implies that legacy measurement performance and mobility is retained. The measurements can be relaxed when the network is aware of spotty coverage on certain frequencies. Furthermore, the network has explicit control over the relaxation, e.g., the network can indicate how much the measurements may be relaxed, i.e., there can be a guarantee for a minimum measurement performance. The wireless device can revert to legacy measurement requirements when the wireless device detects a suitable cell or the wireless device performs cell re-selection.

In some embodiments, the indication that one or more frequencies should have relaxed inter-frequency measurements includes an indication that the one or more frequencies have spotty coverage. In some embodiments, the indication that one or more frequencies should have relaxed inter-frequency measurements includes a single bit for each of the frequencies where one value indicates that the frequency should have relaxed inter-frequency measurements and the other value indicates that the frequency should not have relaxed inter-frequency measurements.

In some embodiments, relaxing inter-frequency measurements for the one or more indicated frequencies includes, if no cell is detected on a frequency after a first time, postponing the next measurement on that frequency for a second time which is longer than the first time. In some embodiments, relaxing inter-frequency measurements for the one or more indicated frequencies also includes, if no cell is again detected on the frequency after second time, again postponing the next measurement on that frequency for an even longer time.

In some embodiments, if the wireless device detects a suitable cell or performs cell re-selection, the wireless device reverts back to legacy measurement requirements. In some embodiments, relaxing inter-frequency measurements for the one or more indicated frequencies includes skipping a defined number of consecutive measurement gaps when measurement gaps are configured. In some embodiments, relaxing inter-frequency measurements for the one or more indicated frequencies includes, if no cell is detected on a frequency after a first time, increasing $T_{higher\_priority\_search}$. In some embodiments, relaxing inter-frequency measurements for the one or more indicated frequencies also includes, if no cell is again detected on the frequency, again increasing $T_{higher\_priority\_search}$.

In some embodiments, the indication that one or more frequencies should have relaxed inter-frequency measurements includes an indication in SIB4 per inter-frequency if the frequency provides spotty coverage and whether the wireless device may apply relaxed inter-frequency measurements when the wireless device fails to detect any suitable cells.

In some embodiments, the indication that one or more frequencies should have relaxed inter-frequency measurements includes an indication in a measurement object (e.g., a MeasObjectNR) for the inter-frequency (e.g., a ssbFrequency).

In some embodiments, a method performed by a base station for relaxing inter-frequency measurements includes determining that one or more frequencies should have relaxed inter-frequency measurements and relaxing inter-frequency measurements for the one or more indicated frequencies. In some embodiments, relaxing inter-frequency measurements for the one or more indicated frequencies includes transmitting to a wireless device an indication that the one or more frequencies should have relaxed inter-frequency measurements. In some embodiments, the indication that one or more frequencies should have relaxed inter-frequency measurements includes an indication that the one or more frequencies have spotty coverage.

In some embodiments, the indication that one or more frequencies should have relaxed inter-frequency measurements includes a single bit for each of the frequencies where one value indicates that the frequency should have relaxed inter-frequency measurements and the other value indicates that the frequency should not have relaxed inter-frequency measurements.

In some embodiments, relaxing inter-frequency measurements for the one or more indicated frequencies includes indicating to the wireless device that if no cell is detected on a frequency after a first time, postponing the next measurement on that frequency for a second time which is longer than the first time.

In some embodiments, relaxing inter-frequency measurements for the one or more indicated frequencies also includes indicating to the wireless device that if no cell is again detected on the frequency after second time, again postponing the next measurement on that frequency for an even longer time.

In some embodiments, the method also includes indicating to the wireless device that if the wireless device detects a suitable cell or performs cell re-selection, the wireless device reverts back to legacy measurement requirements.

In some embodiments, relaxing inter-frequency measurements for the one or more indicated frequencies includes indicating to the wireless device to skip a defined number of consecutive measurement gaps when measurement gaps are configured. In some embodiments, relaxing inter-frequency measurements for the one or more indicated frequencies includes indicating to the wireless device that if no cell is detected on a frequency after a first time, increasing $T_{higher\_priority\_search}$. In some embodiments, relaxing inter-frequency measurements for the one or more indicated frequencies also includes indicating to the wireless device that if no cell is again detected on the frequency, again increasing $T_{higher\_priority\_search}$.

In some embodiments, the indication that one or more frequencies should have relaxed inter-frequency measurements comprises an indication in SIB4 per inter-frequency if the frequency provides spotty coverage, and whether the wireless device may apply relaxed inter-frequency measurements when the wireless device fails to detect any suitable cells.

In some embodiments, the indication that one or more frequencies should have relaxed inter-frequency measurements comprises an indication in a measurement object (e.g., a MeasObjectNR) for the inter-frequency (e.g., a ssbFrequency).

In some embodiments, relaxing inter-frequency measurements for the one or more indicated frequencies includes altering the measurement configuration for the one or more frequencies that should have relaxed inter-frequency measurements.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 14-17 are flowcharts illustrating methods implemented in a communication system, according to some embodiments of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 1:
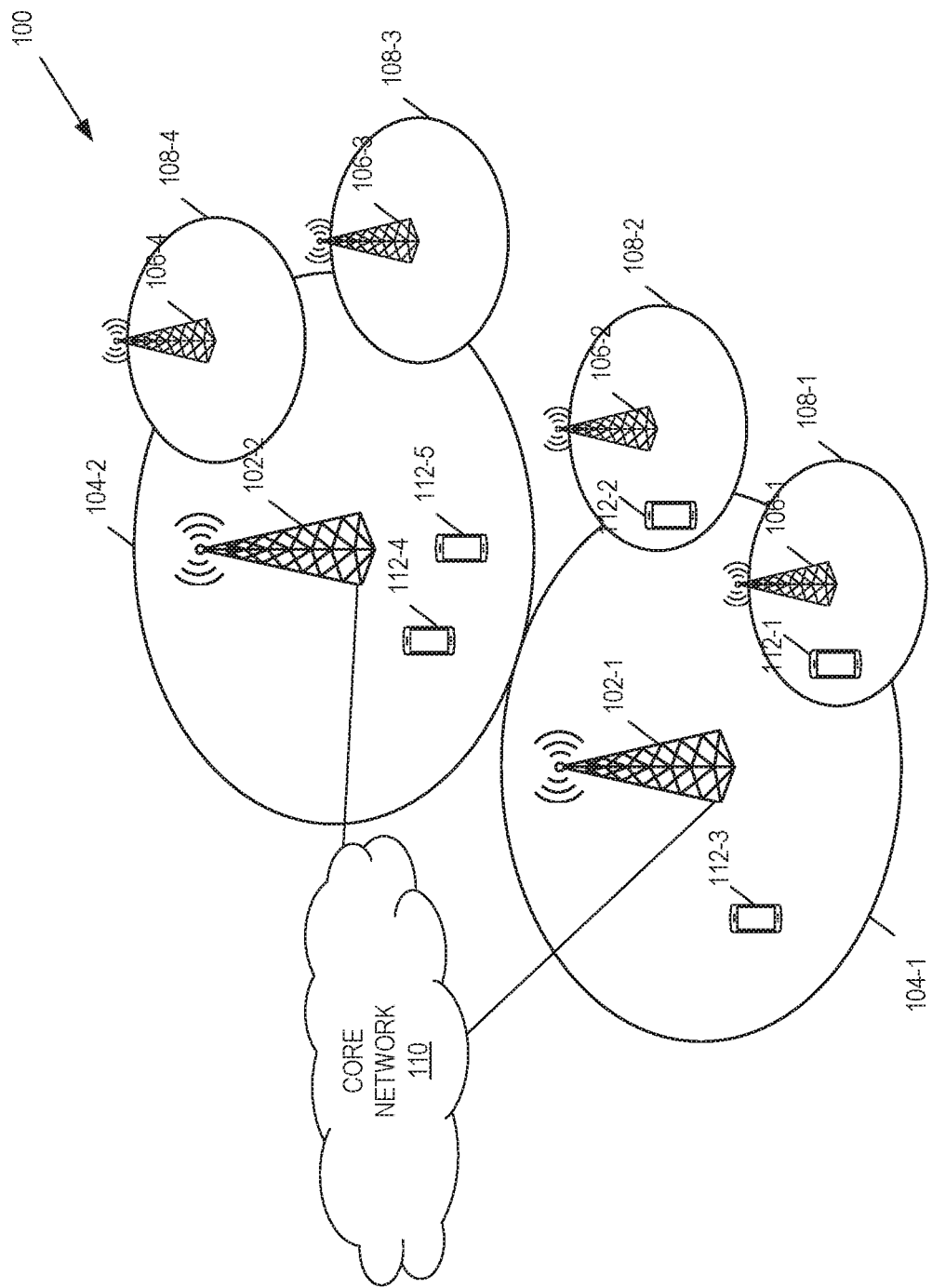
FIG. 1 illustrates one example of a cellular communications network, according to some embodiments of the present disclosure.

FIG. 1 illustrates one example of a cellular communications network 100 according to some embodiments of the present disclosure. In the embodiments described herein, the cellular communications network 100 is a 5G NR network. In this example, the cellular communications network 100 includes base stations 102-1 and 102-2, which in LTE are referred to as eNBs and in 5G NR are referred to as gNBs, controlling corresponding macro cells 104-1 and 104-2. The base stations 102-1 and 102-2 are generally referred to herein collectively as base stations 102 and individually as base station 102. Likewise, the macro cells 104-1 and 104-2 are generally referred to herein collectively as macro cells 104 and individually as macro cell 104. The cellular communications network 100 may also include a number of low power nodes 106-1 through 106-4 controlling corresponding small cells 108-1 through 108-4. The low power nodes 106-1 through 106-4 can be small base stations (such as pico or femto base stations) or Remote Radio Heads (RRHs), or the like. Notably, while not illustrated, one or more of the small cells 108-1 through 108-4 may alternatively be provided by the base stations 102. The low power nodes 106-1 through 106-4 are generally referred to herein collectively as low power nodes 106 and individually as low power node 106. Likewise, the small cells 108-1 through 108-4 are generally referred to herein collectively as small cells 108 and individually as small cell 108. The base stations 102 (and optionally the low power nodes 106) are connected to a core network 110.

The base stations 102 and the low power nodes 106 provide service to wireless devices 112-1 through 112-5 in the corresponding cells 104 and 108. The wireless devices 112-1 through 112-5 are generally referred to herein collectively as wireless devices 112 and individually as wireless device 112. The wireless devices 112 are also sometimes referred to herein as UEs.

Figure 2:
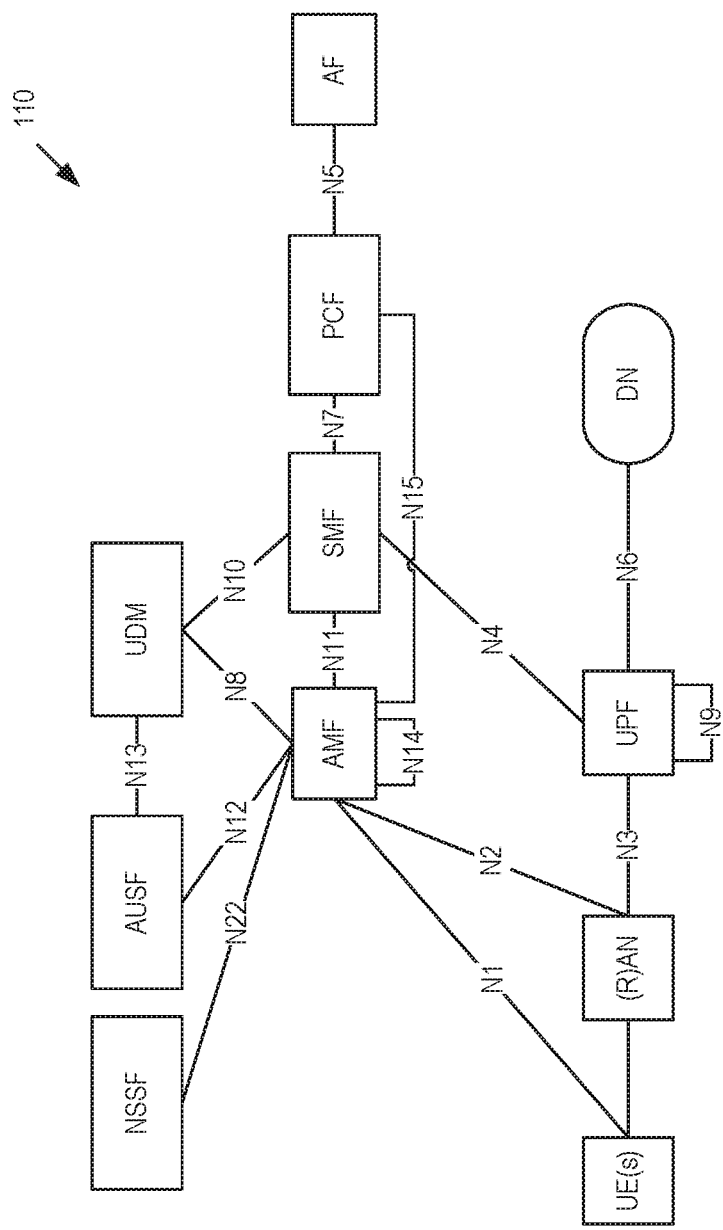
FIG. 2 illustrates a wireless communication system represented as a Fifth Generation (5G) network architecture composed of core Network Functions (NFs), according to some embodiments of the present disclosure.

FIG. 2 illustrates a wireless communication system represented as a 5G network architecture composed of core Network Functions (NFs), where interaction between any two NFs is represented by a point-to-point reference point/interface. FIG. 2 can be viewed as one particular implementation of the system 100 of FIG. 1.

Seen from the access side the 5G network architecture shown in FIG. 2 comprises a plurality of User Equipment (UEs) connected to either a Radio Access Network (RAN) or an Access Network (AN) as well as an Access and Mobility Management Function (AMF). Typically, the R(AN) comprises base stations, e.g., such as evolved Node Bs (eNBs) or 5G base stations (gNBs) or similar. Seen from the core network side, the 5G core NFs shown in FIG. 2 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and User Plane Function (UPF) are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 2, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 2. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 3:
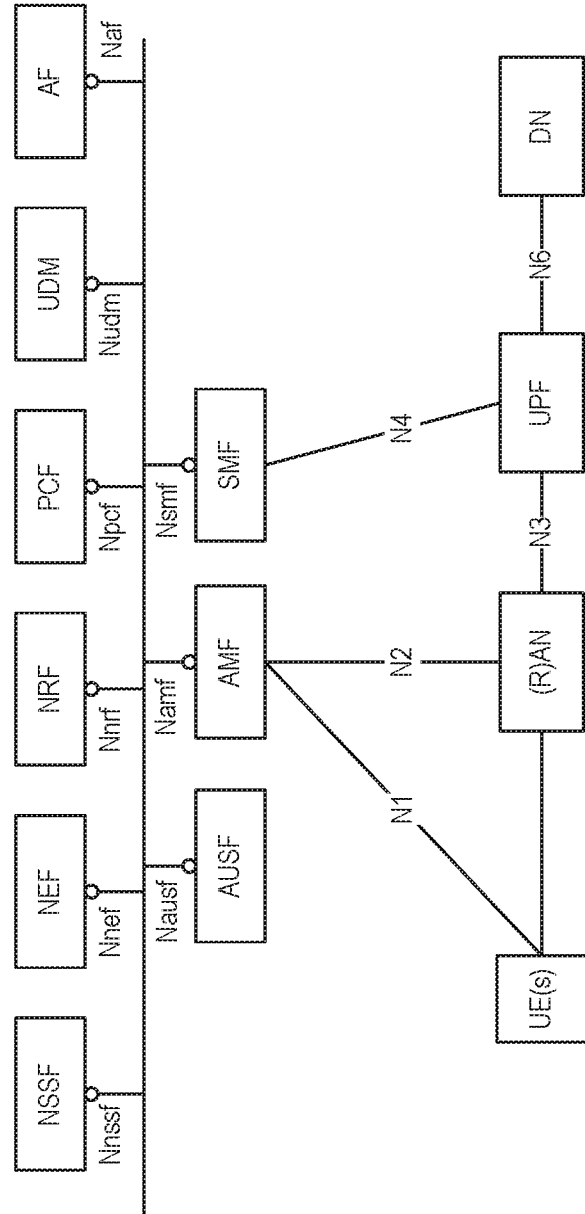
FIG. 3 illustrates a 5G network architecture using service-based interfaces between the NFs in the control plane instead of the point-to-point reference points/interfaces used in the 5G network architecture of FIG. 2, according to some embodiments of the present disclosure.

FIG. 3 illustrates a 5G network architecture using service-based interfaces between the NFs in the control plane, instead of the point-to-point reference points/interfaces used in the 5G network architecture of FIG. 2. However, the NFs described above with reference to FIG. 2 correspond to the NFs shown in FIG. 3. The service(s) etc. that a NF provides to other authorized NFs can be exposed to the authorized NFs through the service-based interface. In FIG. 3 the service based interfaces are indicated by the letter "N" followed by the name of the NF, e.g., Namf for the service based interface of the AMF and Nsmf for the service based interface of the SMF etc. The Network Exposure Function (NEF) and the Network Repository Function (NRF) in FIG. 3 are not shown in FIG. 2 discussed above. However, it should be clarified that all NFs depicted in FIG. 2 can interact with the NEF and the NRF of FIG. 3 as necessary, though not explicitly indicated in FIG. 2.

Some properties of the NFs shown in FIGS. 2 and 3 may be described in the following manner. The AMF provides UE-based authentication, authorization, mobility management, etc. A UE even using multiple access technologies is basically connected to a single AMF because the AMF is independent of the access technologies. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

In connected mode, the UE is required to perform inter-frequency measurements when configured via measurement configuration and when the serving cell is below the S-measure threshold (if configured). Typically, periodic measurement gaps are configured in Connected mode to enable the UE to measure on other NR frequencies. In the gap configuration (e.g., MeasGapConfig) there exist different gap patterns (gap offset, gap repetition period, measurement gap length).

Currently no distinction is made between spotty frequencies and frequencies providing full coverage; one of the reasons perhaps being that the network cannot guarantee that UE finds a suitable cell in all cases anyways. That is, in real and good deployment scenarios, there can always be problem areas. But based on the deployment scenario (e.g., early deployment or hot spots) the network may know in advance that full coverage on certain frequencies cannot be assumed.

There currently exist certain challenges. The UE is currently not aware if a frequency provides spotty coverage due to its deployment scenario or because the UE is in a bad coverage spot. It should also be noted that bad coverage spots may arise temporarily due to changing radio environment (e.g., moving objects).

The network could try to configure only those frequencies in system information in Idle/Inactive mode for which the UE can find coverage. But in certain deployment scenarios (e.g., early deployment or hot spots) this may not be possible.

The network could try to configure inter-frequency measurements in Connected mode only when the UE is in coverage on a certain frequency. But this may require exact and precise information in the gNB of the UE's location and detailed knowledge about the inter-frequency coverage.

Both in Idle/Inactive mode and Connected mode, the UE can be required to measure on an NR frequency, but due to the spotty coverage, the UE may not detect any (suitable) cell. This situation could change when the UE moves, but while the UE is stationary, this situation may persist for some time and thus cause unnecessary UE power consumption.

When the UE does not detect any suitable cells on an inter-frequency, it normally does not mean that the UE should not continue to measure on such frequency, i.e., the UE may be an area where the inter-frequency coverage is weak. As such, improved systems and methods are needed.

Systems and methods for relaxed inter-frequency measurements are provided. In some embodiments, a method performed by a wireless device for relaxing inter-frequency measurements includes receiving an indication that one or more frequencies should have relaxed inter-frequency measurements; and relaxing the inter-frequency measurements for the one or more indicated frequencies. In this way, in some embodiments, the wireless device relaxes measurements on that frequency only when the network indicates that relaxed measurements may be applied to the inter-frequency. This implies that legacy measurement performance and mobility is retained. The measurements can be relaxed when the network is aware of spotty coverage on certain frequencies. Furthermore, the network has explicit control over the relaxation, e.g., the network can indicate how much the measurements may be relaxed, i.e., there can be a guarantee for a minimum measurement performance. The wireless device can revert to legacy measurement requirements when the wireless device detects a suitable cell or the wireless device performs cell re-selection.

Some embodiments could include one or more of the following:
1. Indication per NR inter-frequency whether the frequency provides "normal" or "spotty" coverage.
2. Control of relaxed measurements on "spotty" frequency.
3. Return to legacy measurements when the UE detects a suitable cell or the UE performs cell re-selection.

Some embodiments of the current disclosure relate to relaxation of inter-frequency measurements in spotty coverage.

On certain frequencies, there could be spotty coverage, e.g., in early deployment scenarios or when high capacity cells with small range are deployed at "hot spots." Both in IDLE/INACTIVE mode and CONNECTED mode, the UE can be requested to measure on an inter-frequency. However, due to spotty coverage, the UE might not detect any suitable cell. This situation could change when the UE moves. However, while the UE is stationary, this situation may persist for some time and thus cause unnecessary UE power consumption. Observation 1: Spotty inter-frequency coverage may cause unnecessary UE power consumption.

When the UE does not detect any (suitable) cells on an inter-frequency, it normally does not mean that the UE should not continue to measure on such frequency, i.e., the UE may be an area where the inter-frequency coverage is weak. But in case the network is aware of spotty coverage due to the specific deployment scenario, then the network could indicate this to the UE for specific frequencies.

Figure 4:
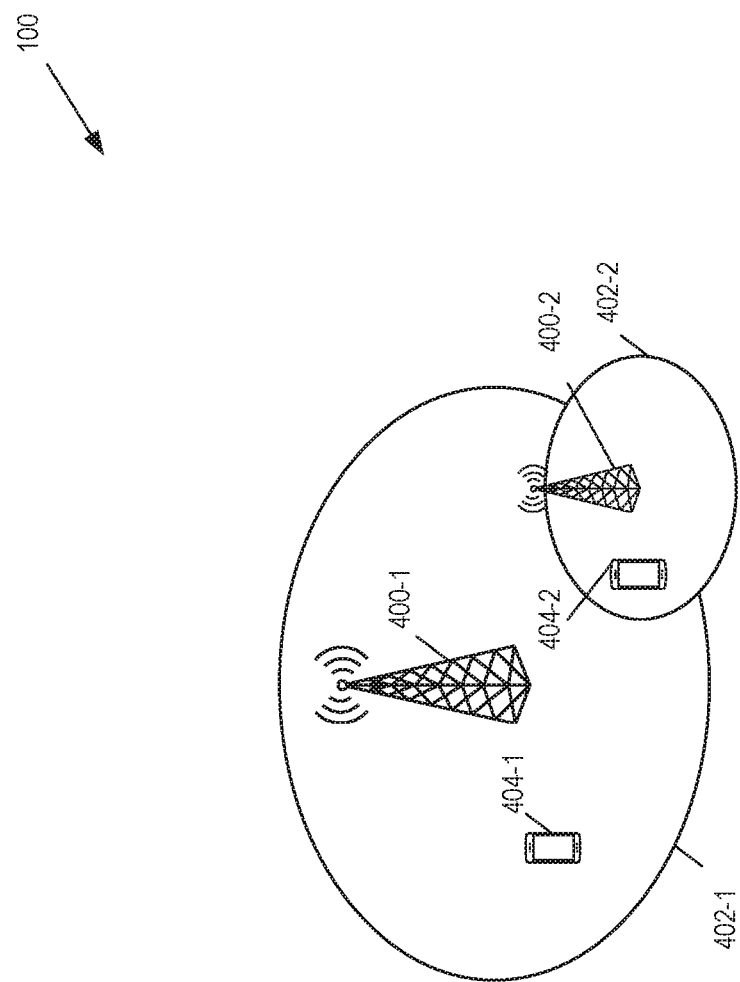
FIG. 4 illustrates an example situation where spotty coverage may occur, according to some embodiments of the present disclosure.

FIG. 4 illustrates an example situation where spotty coverage may occur. This example of a cellular communications network 100 includes base stations 400-1 and 400-2, which in LTE are referred to as eNBs and in 5G NR are referred to as gNBs, controlling corresponding cells 402-1 and 402-2. The base stations 400-1 and 400-2 provide service to wireless devices 404-1 and 404-2 in the corresponding cells. In this embodiment, the base station 400-2 is part of an early deployment scenario or a high capacity cell with small range deployed at a "hot spot." In this case, a frequency used by base station 400-2 has spotty coverage. If both wireless devices 404-1 and 404-2 are configured to make inter-frequency measurements on this frequency, wireless device 404-1 might not be able to find any cell while wireless device 404-2 might be able to make measurements without problems.

In instances such as this, the network could indicate which frequencies can be expected to provide spotty coverage due to the deployment scenario on that frequency. For instance, the wireless devices 404-1 and 404-2 could be informed that a frequency used by base station 400-2 has spotty coverage. In this way, the wireless devices 404-1 and 404-2 could take certain actions to apply relaxed inter-frequency measurements when it does not detect any (suitable) cell. This could reduce unnecessary power consumption.

Also, in the case where the network knows that a frequency used by base station 400-2 has spotty coverage, the network could alter the measurement configurations sent to the wireless devices. This could reduce unnecessary power consumption.

Figure 5:
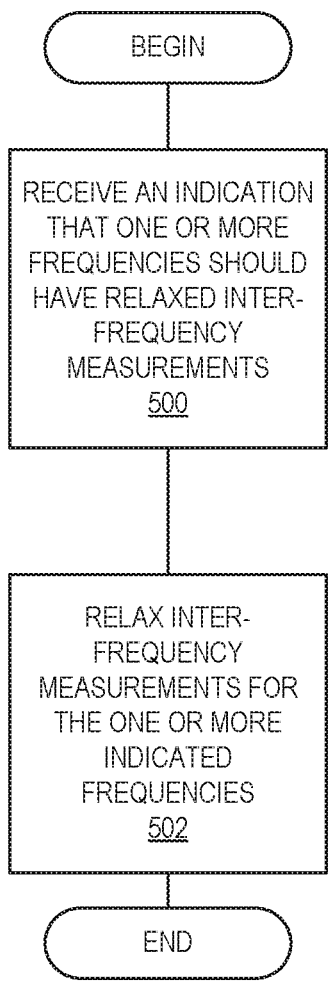
FIG. 5 illustrates a method performed by a wireless device for relaxing inter-frequency measurements according to some embodiments of the present disclosure.

For instance, FIG. 5 illustrates a method performed by a wireless device for relaxing inter-frequency measurements according to some embodiments. The wireless device (such as wireless device 404-1) receives an indication that one or more frequencies should have relaxed inter-frequency measurements (step 500). The wireless device then relaxes inter-frequency measurements for the one or more indicated frequencies (step 502). This relaxation can be accomplished in many ways as discussed herein.

Figure 6:
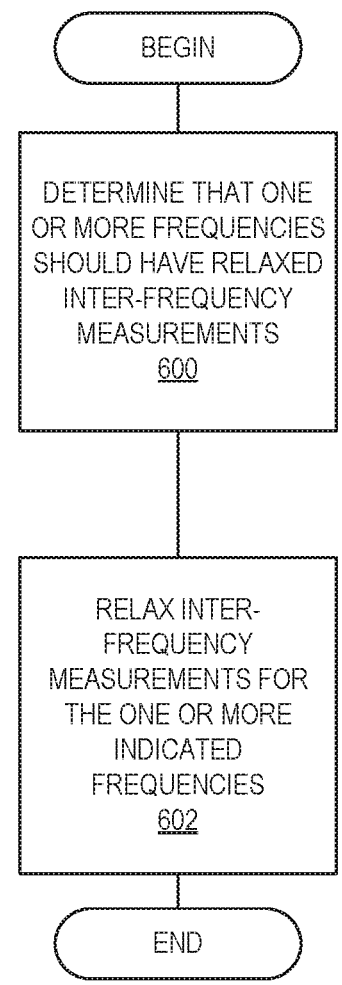
FIG. 6 illustrates a method performed by a base station for relaxing inter-frequency measurements, according to some embodiments of the present disclosure.

Similarly, FIG. 6 illustrates a method performed by a base station for relaxing inter-frequency measurements according to some embodiments. The base station (or any other appropriate node) determines that one or more frequencies should have relaxed inter-frequency measurements (step 600). The base station then relaxes inter-frequency measurements for the one or more indicated frequencies (step 602). This relaxation can be accomplished in many ways as discussed herein. For instance, in some embodiments, the relaxation is accomplished by the base station altering how to indicate and/or schedule measurements. In some embodiments, the relaxation is accomplished by the base station indicating to the wireless device that one or more frequencies should have relaxed inter-frequency measurements.

Such indication could be as simple as a single bit indicator indicating "spotty" or "normal" (default) coverage (when an Information Element (IE) is omitted). In case the network has indicated spotty coverage for a frequency, it can be studied further if some relaxed monitoring can be allowed for that frequency, for example:
1. When no (suitable) cell is detected after a first time period (e.g., T1 seconds) on the frequency, the UE may postpone measurements on that frequency for a second time period (e.g., T2 seconds).
2. When the UE detects a suitable cell or the UE performs cell re-selection, the UE reverts back to legacy measurement requirements.

In case the network is aware of spotty coverage due to the specific deployment scenario, then the network could indicate this to the UE for specific frequencies, both in Idle/Inactive and Connected mode.

The network could indicate which frequencies can be expected to provide spotty coverage due to the deployment scenario on that frequency. Such indication could be as simple as a single bit indicator indication of "spotty" or "normal" (default) coverage (i.e., when the IE is omitted), or more detailed information could be provided. Instead of "spotty" indication, it could be indicated that UE may apply relaxed inter-frequency measurements for that frequency instead. More detailed information may include that the network indicates not only which frequencies have spotty coverage, but that the order in which those frequencies are signalled indicates some relative ordering how the UE should spend it measurement effort over those frequencies.

In case the network has indicated spotty coverage for a frequency, the UE may apply relaxed inter-frequency measurements when it does not detect any (suitable) cell.

The measurement relaxation may depend on whether priority based or equal priority (i.e., cell ranking) inter-frequency cell re-selection is configured:

For example, in some embodiments, equal priority based cell re-selection (cell ranking) can be used. In some embodiments, when no (suitable) cell is detected after T1 (seconds), the UE may postpone measurements on that frequency for T2 (seconds). When repeated measurements do not lead to any detected cells, T2 may be increased further. When the UE detects a suitable cell or the UE performs cell re-selection, the UE reverts back to legacy measurement requirements. The measurement relaxation could be defined in the number of consecutive measurement gaps that the UE may skip to use to measure when measurement gaps are configured.

As another example, in some embodiments, priority based cell re-selection can be used. In some embodiments, increased $T_{higher\_priority\_search}$ occurs when no (suitable) cell is detected after T1 (seconds). When repeated measurements do not lead to any detected cells, $T_{higher\_priority\_search}$ may be increased further. When the UE detects a suitable cell or the UE performs cell re-selection, the UE reverts back to legacy measurement requirements. The measurement relaxation could be defined in the number of consecutive measurement gaps that the UE may skip to use to measure when measurement gaps are configured.

When the UE is in Idle/Inactive mode, some embodiments include an indication in System Information Block 4 (SIB4) per inter-frequency if the frequency provides spotty coverage, and whether the UE may apply relaxed inter-frequency measurements when it fails to detect any suitable cells (3GPP TS 38.331). In some embodiments, relaxed inter-frequency measurements can be specified when the network has indicated spotty coverage (3GPP TS 38.304).

When the UE is in Connected mode, some embodiments include an indication in the measurement object (e.g., MeasObjectNR) for the inter-frequency (e.g., ssbFrequency). In some embodiments, relaxed inter-frequency measurements can be specified when the network has indicated spotty coverage (3GPP TS 38.133).

Figure 7:
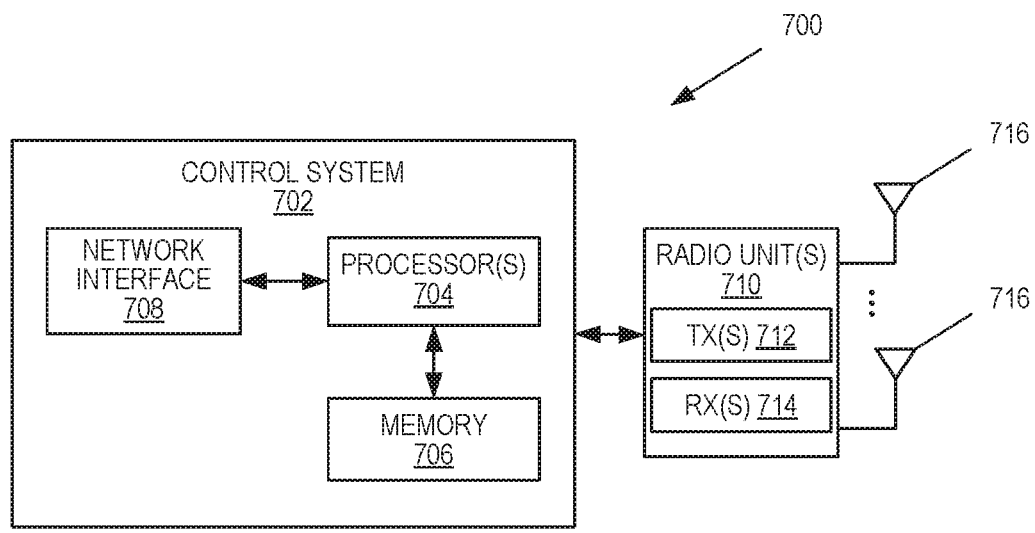
FIG. 7 is a schematic block diagram of a radio access node according to some embodiments of the present disclosure.

FIG. 7 is a schematic block diagram of a radio access node 700 according to some embodiments of the present disclosure. The radio access node 700 may be, for example, a base station 102 or 106. As illustrated, the radio access node 700 includes a control system 702 that includes one or more processors 704 (e.g., Central Processing Units (CPUs), Application Specific Integrated Circuits (ASICs), Field Programmable Gate Arrays (FPGAs), and/or the like), memory 706, and a network interface 708. The one or more processors 704 are also referred to herein as processing circuitry. In addition, the radio access node 700 includes one or more radio units 710 that each includes one or more transmitters 712 and one or more receivers 714 coupled to one or more antennas 716. The radio units 710 may be referred to or be part of radio interface circuitry. In some embodiments, the radio unit(s) 710 is external to the control system 702 and connected to the control system 702 via, e.g., a wired connection (e.g., an optical cable). However, in some other embodiments, the radio unit(s) 710 and potentially the antenna(s) 716 are integrated together with the control system 702. The one or more processors 704 operate to provide one or more functions of a radio access node 700 as described herein. In some embodiments, the function(s) are implemented in software that is stored, e.g., in the memory 706 and executed by the one or more processors 704.

Figure 8:
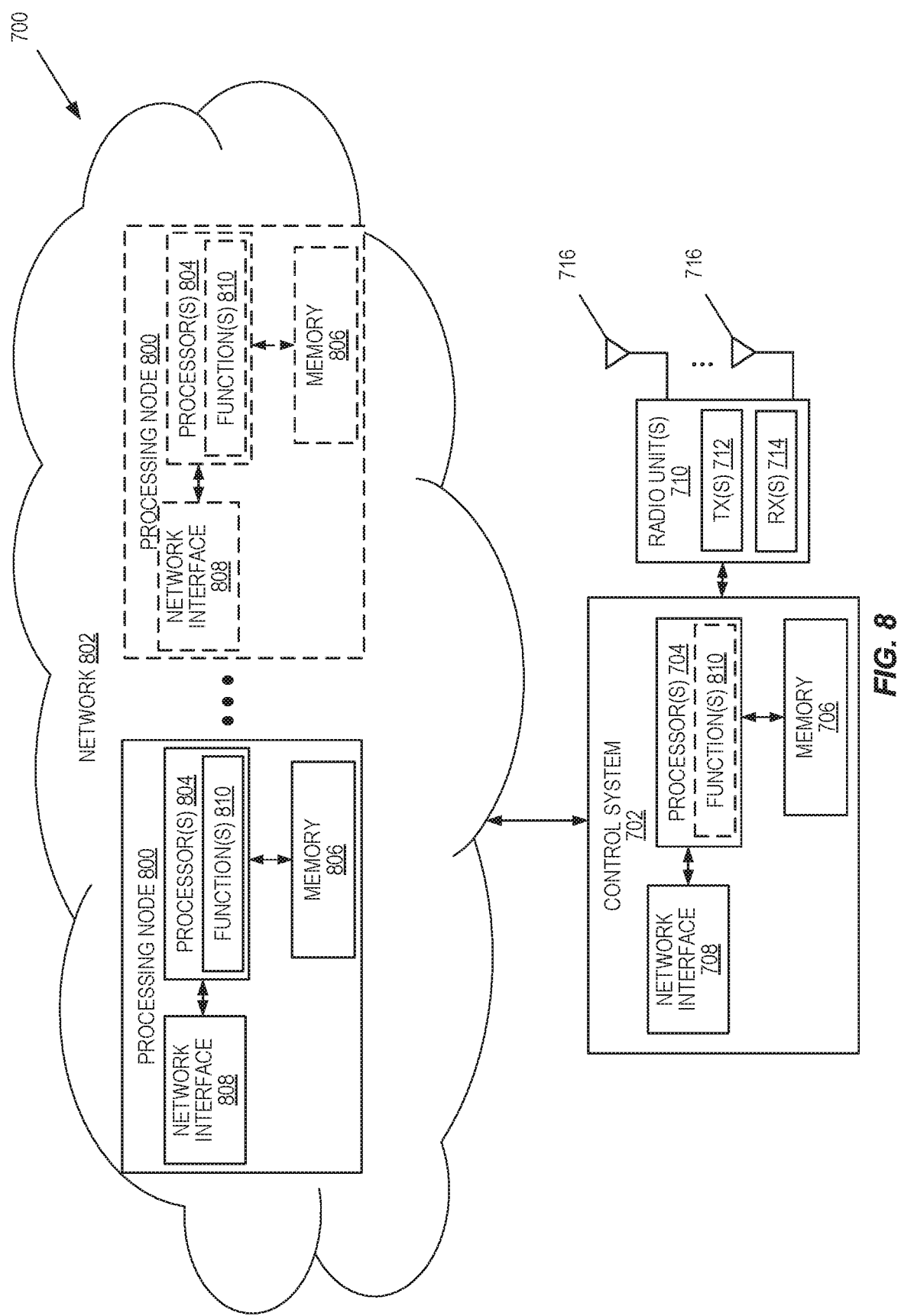
FIG. 8 is a schematic block diagram that illustrates a virtualized embodiment of the radio access node according to some embodiments of the present disclosure.

FIG. 8 is a schematic block diagram that illustrates a virtualized embodiment of the radio access node 700 according to some embodiments of the present disclosure. This discussion is equally applicable to other types of network nodes. Further, other types of network nodes may have similar virtualized architectures.

As used herein, a "virtualized" radio access node is an implementation of the radio access node 700 in which at least a portion of the functionality of the radio access node 700 is implemented as a virtual component(s) (e.g., via a virtual machine(s) executing on a physical processing node(s) in a network(s)). As illustrated, in this example, the radio access node 700 includes the control system 702 that includes the one or more processors 704 (e.g., CPUs, ASICs, FPGAs, and/or the like), the memory 706, and the network interface 708 and the one or more radio units 710 that each includes the one or more transmitters 712 and the one or more receivers 714 coupled to the one or more antennas 716, as described above. The control system 702 is connected to the radio unit(s) 710 via, for example, an optical cable or the like. The control system 702 is connected to one or more processing nodes 800 coupled to or included as part of a network(s) 802 via the network interface 708. Each processing node 800 includes one or more processors 804 (e.g., CPUs, ASICs, FPGAs, and/or the like), memory 806, and a network interface 808.

In this example, functions 810 of the radio access node 700 described herein are implemented at the one or more processing nodes 800 or distributed across the control system 702 and the one or more processing nodes 800 in any desired manner. In some particular embodiments, some or all of the functions 810 of the radio access node 700 described herein are implemented as virtual components executed by one or more virtual machines implemented in a virtual environment(s) hosted by the processing node(s) 800. As will be appreciated by one of ordinary skill in the art, additional signaling or communication between the processing node(s) 800 and the control system 702 is used in order to carry out at least some of the desired functions 810. Notably, in some embodiments, the control system 702 may not be included, in which case the radio unit(s) 710 communicate directly with the processing node(s) 800 via an appropriate network interface(s).

In some embodiments, a computer program including instructions which, when executed by at least one processor, causes the at least one processor to carry out the functionality of radio access node 700 or a node (e.g., a processing node 800) implementing one or more of the functions 810 of the radio access node 700 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 9:
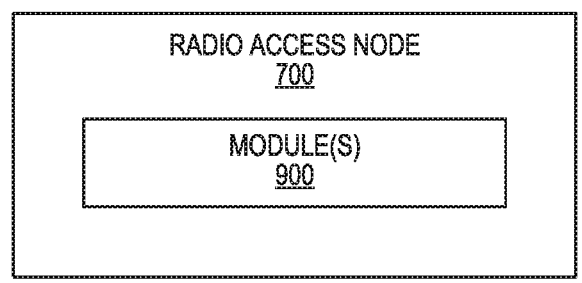
FIG. 9 is a schematic block diagram of the radio access node according to some other embodiments of the present disclosure.

FIG. 9 is a schematic block diagram of the radio access node 700 according to some other embodiments of the present disclosure. The radio access node 700 includes one or more modules 900, each of which is implemented in software. The module(s) 900 provide the functionality of the radio access node 700 described herein. This discussion is equally applicable to the processing node 800 of FIG. 8 where the modules 900 may be implemented at one of the processing nodes 800 or distributed across multiple processing nodes 800 and/or distributed across the processing node(s) 800 and the control system 702.

Figure 10:
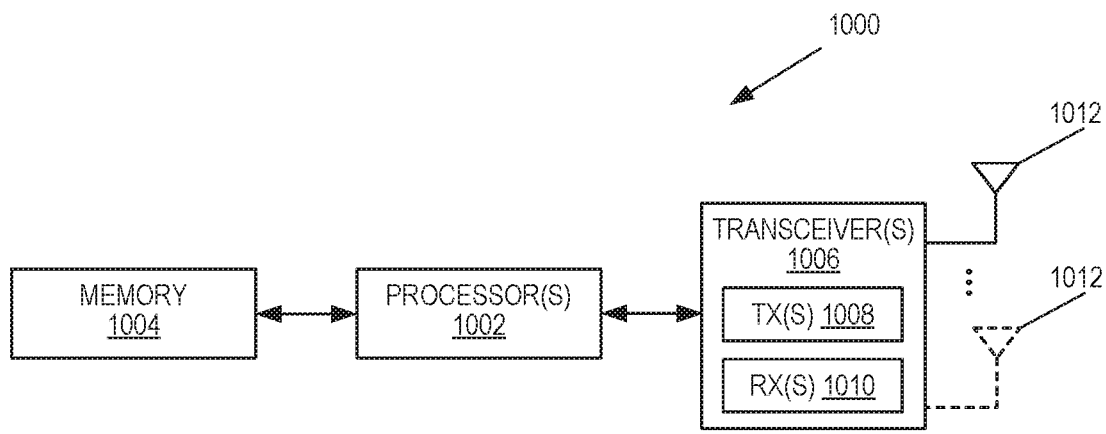
FIG. 10 is a schematic block diagram of a wireless communication device according to some embodiments of the present disclosure.

FIG. 10 is a schematic block diagram of a UE 1000 according to some embodiments of the present disclosure. As illustrated, the UE 1000 includes one or more processors 1002 (e.g., CPUs, ASICs, FPGAs, and/or the like), memory 1004, and one or more transceivers 1006 each including one or more transmitters 1008 and one or more receivers 1010 coupled to one or more antennas 1012. The transceiver(s) 1006 includes radio-front end circuitry connected to the antenna(s) 1012 that is configured to condition signals communicated between the antenna(s) 1012 and the processor(s) 1002, as will be appreciated by on of ordinary skill in the art. The processors 1002 are also referred to herein as processing circuitry. The transceivers 1006 are also referred to herein as radio circuitry. In some embodiments, the functionality of the UE 1000 described above may be fully or partially implemented in software that is, e.g., stored in the memory 1004 and executed by the processor(s) 1002. Note that the UE 1000 may include additional components not illustrated in FIG. 10 such as, e.g., one or more user interface components (e.g., an input/output interface including a display, buttons, a touch screen, a microphone, a speaker(s), and/or the like and/or any other components for allowing input of information into the UE 1000 and/or allowing output of information from the UE 1000), a power supply (e.g., a battery and associated power circuitry), etc.

In some embodiments, a computer program including instructions which, when executed by at least one processor, causes the at least one processor to carry out the functionality of the UE 1000 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
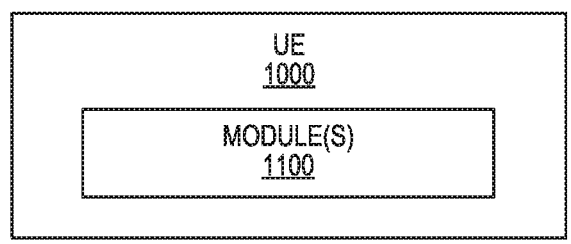
FIG. 11 is a schematic block diagram of the wireless communication device according to some other embodiments of the present disclosure.

FIG. 11 is a schematic block diagram of the UE 1000 according to some other embodiments of the present disclosure. The UE 1000 includes one or more modules 1100, each of which is implemented in software. The module(s) 1100 provide the functionality of the UE 1000 described herein.

Figure 12:
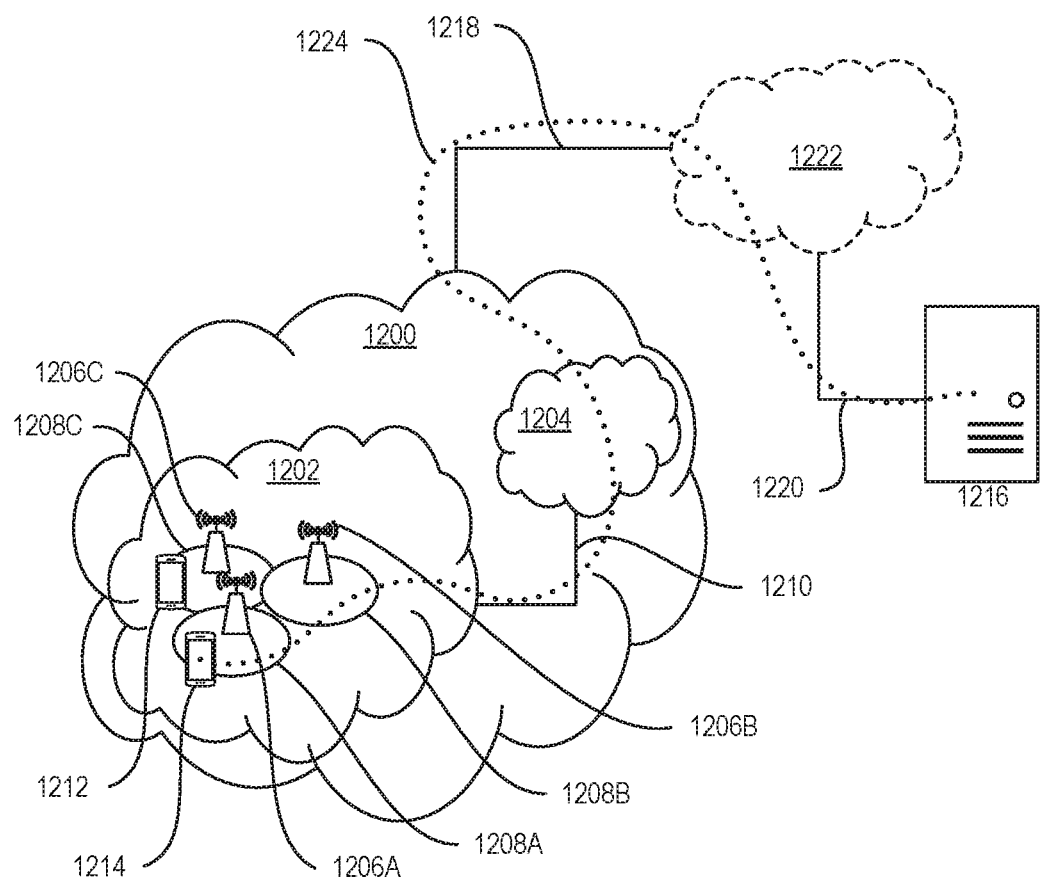
FIG. 12 illustrates a communication system which includes a telecommunication network, such as a Third Generation Partnership Project (3GPP)-type cellular network, which comprises an access network, such as a Radio Access Network (RAN), and a core network, according to some embodiments of the present disclosure.

With reference to FIG. 12, in accordance with an embodiment, a communication system includes a telecommunication network 1200, such as a 3GPP-type cellular network, which comprises an access network 1202, such as a RAN, and a core network 1204. The access network 1202 comprises a plurality of base stations 1206A, 1206B, 1206C, such as NBs, eNBs, gNBs, or other types of wireless Access Points (APs), each defining a corresponding coverage area 1208A, 1208B, 1208C. Each base station 1206A, 1206B, 1206C is connectable to the core network 1204 over a wired or wireless connection 1210. A first UE 1212 located in coverage area 1208C is configured to wirelessly connect to, or be paged by, the corresponding base station 1206C. A second UE 1214 in coverage area 1208A is wirelessly connectable to the corresponding base station 1206A. While a plurality of UEs 1212, 1214 are illustrated in this example, the disclosed embodiments are equally applicable to a situation where a sole UE is in the coverage area or where a sole UE is connecting to the corresponding base station 1206.

The telecommunication network 1200 is itself connected to a host computer 1216, which may be embodied in the hardware and/or software of a standalone server, a cloud-implemented server, a distributed server, or as processing resources in a server farm. The host computer 1216 may be under the ownership or control of a service provider, or may be operated by the service provider or on behalf of the service provider. Connections 1218 and 1220 between the telecommunication network 1200 and the host computer 1216 may extend directly from the core network 1204 to the host computer 1216 or may go via an optional intermediate network 1222. The intermediate network 1222 may be one of, or a combination of more than one of, a public, private, or hosted network; the intermediate network 1222, if any, may be a backbone network or the Internet; in particular, the intermediate network 1222 may comprise two or more sub-networks (not shown).

The communication system of FIG. 12 as a whole enables connectivity between the connected UEs 1212, 1214, and the host computer 1216. The connectivity may be described as an Over-the-Top (OTT) connection 1224. The host computer 1216 and the connected UEs 1212, 1214 are configured to communicate data and/or signaling via the OTT connection 1224, using the access network 1202, the core network 1204, any intermediate network 1222, and possible further infrastructure (not shown) as intermediaries. The OTT connection 1224 may be transparent in the sense that the participating communication devices through which the OTT connection 1224 passes are unaware of routing of uplink and downlink communications. For example, the base station 1206 may not or need not be informed about the past routing of an incoming downlink communication with data originating from the host computer 1216 to be forwarded (e.g., handed over) to a connected UE 1212. Similarly, the base station 1206 need not be aware of the future routing of an outgoing uplink communication originating from the UE 1212 towards the host computer 1216.

Example implementations, in accordance with an embodiment, of the UE, base station, and host computer discussed in the preceding paragraphs will now be described with reference to FIG. 13. In a communication system 1300, a host computer 1302 comprises hardware 1304 including a communication interface 1306 configured to set up and maintain a wired or wireless connection with an interface of a different communication device of the communication system 1300. The host computer 1302 further comprises processing circuitry 1308, which may have storage and/or processing capabilities. In particular, the processing circuitry 1308 may comprise one or more programmable processors, ASICs, FPGAs, or combinations of these (not shown) adapted to execute instructions. The host computer 1302 further comprises software 1310, which is stored in or accessible by the host computer 1302 and executable by the processing circuitry 1308. The software 1310 includes a host application 1312. The host application 1312 may be operable to provide a service to a remote user, such as a UE 1314 connecting via an OTT connection 1316 terminating at the UE 1314 and the host computer 1302. In providing the service to the remote user, the host application 1312 may provide user data which is transmitted using the OTT connection 1316.

The communication system 1300 further includes a base station 1318 provided in a telecommunication system and comprising hardware 1320 enabling it to communicate with the host computer 1302 and with the UE 1314. The hardware 1320 may include a communication interface 1322 for setting up and maintaining a wired or wireless connection with an interface of a different communication device of the communication system 1300, as well as a radio interface 1324 for setting up and maintaining at least a wireless connection 1326 with the UE 1314 located in a coverage area (not shown in FIG. 13) served by the base station 1318. The communication interface 1322 may be configured to facilitate a connection 1328 to the host computer 1302. The connection 1328 may be direct or it may pass through a core network (not shown in FIG. 13) of the telecommunication system and/or through one or more intermediate networks outside the telecommunication system. In the embodiment shown, the hardware 1320 of the base station 1318 further includes processing circuitry 1330, which may comprise one or more programmable processors, ASICs, FPGAs, or combinations of these (not shown) adapted to execute instructions. The base station 1318 further has software 1332 stored internally or accessible via an external connection.

The communication system 1300 further includes the UE 1314 already referred to. The UE's 1314 hardware 1334 may include a radio interface 1336 configured to set up and maintain a wireless connection 1326 with a base station serving a coverage area in which the UE 1314 is currently located. The hardware 1334 of the UE 1314 further includes processing circuitry 1338, which may comprise one or more programmable processors, ASICs, FPGAs, or combinations of these (not shown) adapted to execute instructions. The UE 1314 further comprises software 1340, which is stored in or accessible by the UE 1314 and executable by the processing circuitry 1338. The software 1340 includes a client application 1342. The client application 1342 may be operable to provide a service to a human or non-human user via the UE 1314, with the support of the host computer 1302. In the host computer 1302, the executing host application 1312 may communicate with the executing client application 1342 via the OTT connection 1316 terminating at the UE 1314 and the host computer 1302. In providing the service to the user, the client application 1342 may receive request data from the host application 1312 and provide user data in response to the request data. The OTT connection 1316 may transfer both the request data and the user data. The client application 1342 may interact with the user to generate the user data that it provides.

Figure 13:
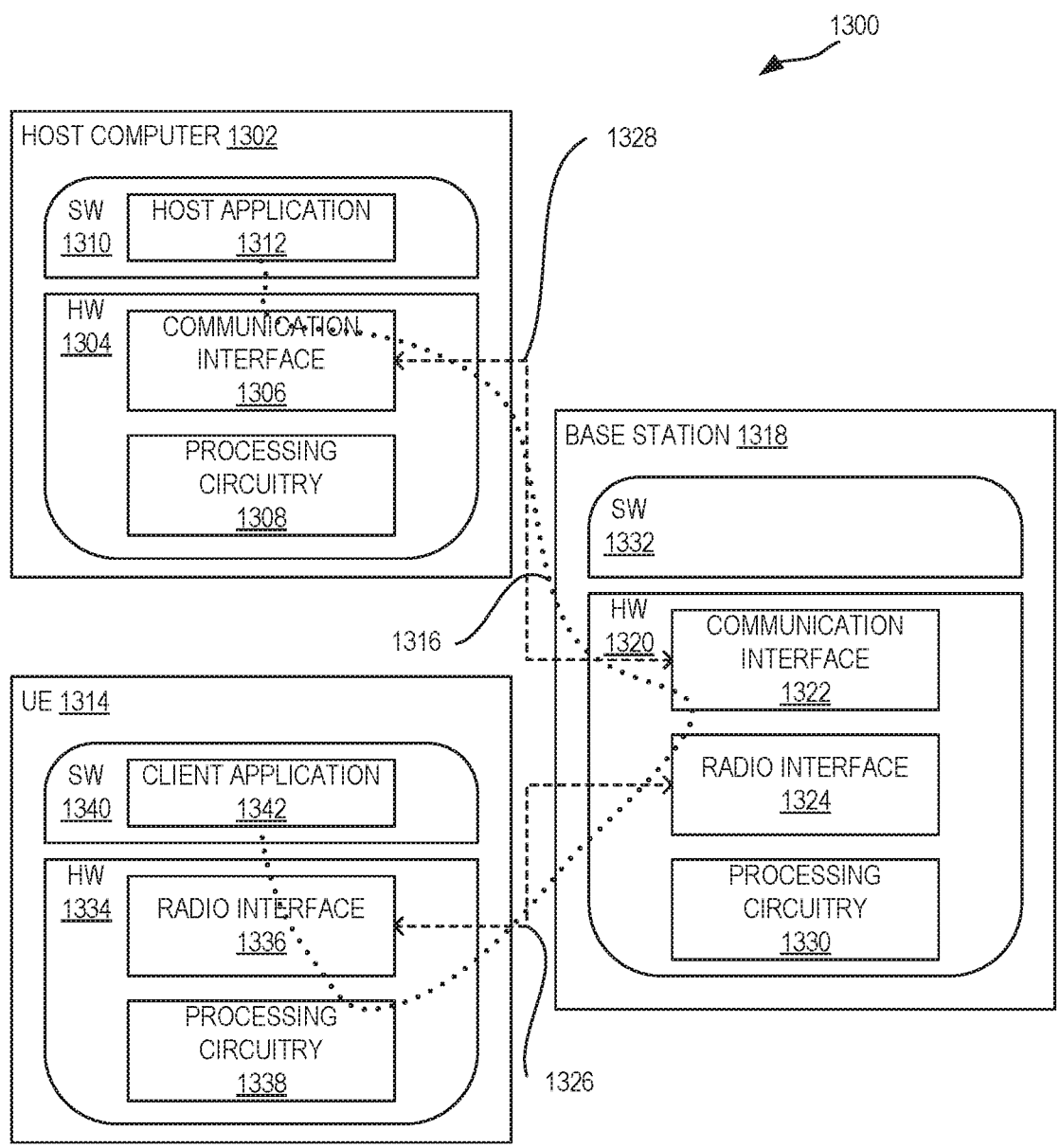
FIG. 13 illustrates a communication system, a host computer comprises hardware including a communication interface configured to set up and maintain a wired or wireless connection with an interface of a different communication device of the communication system, according to some embodiments of the present disclosure.

It is noted that the host computer 1302, the base station 1318, and the UE 1314 illustrated in FIG. 13 may be similar or identical to the host computer 1216, one of the base stations 1206A, 1206B, 1206C, and one of the UEs 1212, 1214 of FIG. 12, respectively. This is to say, the inner workings of these entities may be as shown in FIG. 13 and independently, the surrounding network topology may be that of FIG. 12.

In FIG. 13, the OTT connection 1316 has been drawn abstractly to illustrate the communication between the host computer 1302 and the UE 1314 via the base station 1318 without explicit reference to any intermediary devices and the precise routing of messages via these devices. The network infrastructure may determine the routing, which may be configured to hide from the UE 1314 or from the service provider operating the host computer 1302, or both. While the OTT connection 1316 is active, the network infrastructure may further take decisions by which it dynamically changes the routing (e.g., on the basis of load balancing consideration or reconfiguration of the network).

The wireless connection 1326 between the UE 1314 and the base station 1318 is in accordance with the teachings of the embodiments described throughout this disclosure. One or more of the various embodiments improve the performance of OTT services provided to the UE 1314 using the OTT connection 1316, in which the wireless connection 1326 forms the last segment. More precisely, the teachings of these embodiments may improve the power consumption and thereby provide benefits such as extended battery lifetime.

A measurement procedure may be provided for the purpose of monitoring data rate, latency, and other factors on which the one or more embodiments improve. There may further be an optional network functionality for reconfiguring the OTT connection 1316 between the host computer 1302 and the UE 1314, in response to variations in the measurement results. The measurement procedure and/or the network functionality for reconfiguring the OTT connection 1316 may be implemented in the software 1310 and the hardware 1304 of the host computer 1302 or in the software 1340 and the hardware 1334 of the UE 1314, or both. In some embodiments, sensors (not shown) may be deployed in or in association with communication devices through which the OTT connection 1316 passes; the sensors may participate in the measurement procedure by supplying values of the monitored quantities exemplified above, or supplying values of other physical quantities from which the software 1310, 1340 may compute or estimate the monitored quantities. The reconfiguring of the OTT connection 1316 may include message format, retransmission settings, preferred routing, etc.; the reconfiguring need not affect the base station 1318, and it may be unknown or imperceptible to the base station 1318. Such procedures and functionalities may be known and practiced in the art. In certain embodiments, measurements may involve proprietary UE signaling facilitating the host computer 1302's measurements of throughput, propagation times, latency, and the like. The measurements may be implemented in that the software 1310 and 1340 causes messages to be transmitted, in particular empty or 'dummy' messages, using the OTT connection 1316 while it monitors propagation times, errors, etc.

Figures 14, 15:
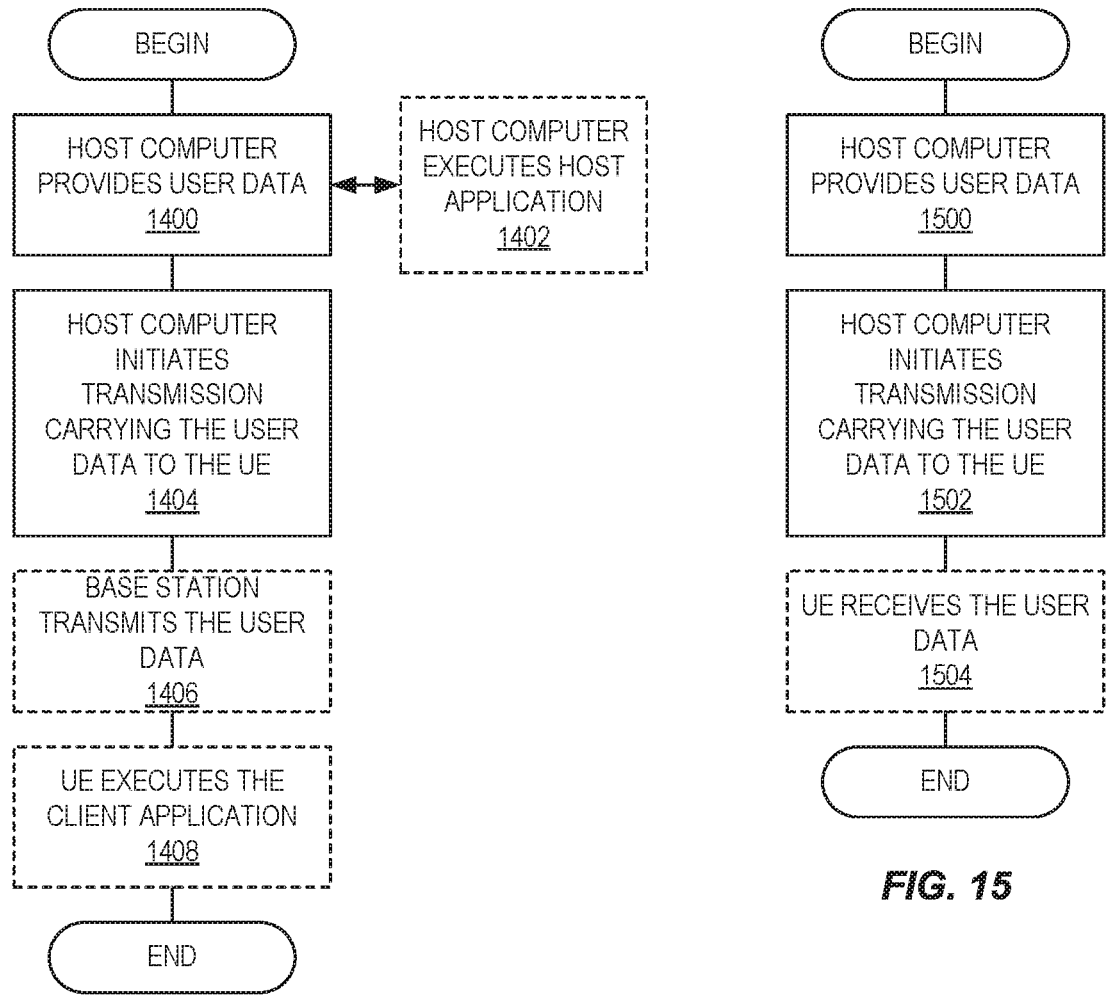

FIG. 14 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 14 will be included in this section. In step 1400, the host computer provides user data. In sub-step 1402 (which may be optional) of step 1400, the host computer provides the user data by executing a host application. In step 1404, the host computer initiates a transmission carrying the user data to the UE. In step 1406 (which may be optional), the base station transmits to the UE the user data which was carried in the transmission that the host computer initiated, in accordance with the teachings of the embodiments described throughout this disclosure. In step 1408 (which may also be optional), the UE executes a client application associated with the host application executed by the host computer.

FIG. 15 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 15 will be included in this section. In step 1500 of the method, the host computer provides user data. In an optional sub-step (not shown) the host computer provides the user data by executing a host application. In step 1502, the host computer initiates a transmission carrying the user data to the UE. The transmission may pass via the base station, in accordance with the teachings of the embodiments described throughout this disclosure. In step 1504 (which may be optional), the UE receives the user data carried in the transmission.

FIG. 16 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 16 will be included in this section. In step 1600 (which may be optional), the UE receives input data provided by the host computer. Additionally or alternatively, in step 1602, the UE provides user data. In sub-step 1604 (which may be optional) of step 1600, the UE provides the user data by executing a client application. In sub-step 1606 (which may be optional) of step 1602, the UE executes a client application which provides the user data in reaction to the received input data provided by the host computer. In providing the user data, the executed client application may further consider user input received from the user. Regardless of the specific manner in which the user data was provided, the UE initiates, in sub-step 1608 (which may be optional), transmission of the user data to the host computer. In step 1610 of the method, the host computer receives the user data transmitted from the UE, in accordance with the teachings of the embodiments described throughout this disclosure.

FIG. 17 is a flowchart illustrating a method implemented in a communication system, in accordance with one embodiment. The communication system includes a host computer, a base station, and a UE which may be those described with reference to FIGS. 12 and 13. For simplicity of the present disclosure, only drawing references to FIG. 17 will be included in this section. In step 1700 (which may be optional), in accordance with the teachings of the embodiments described throughout this disclosure, the base station receives user data from the UE.

In step 1702 (which may be optional), the base station initiates transmission of the received user data to the host computer. In step 1704 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Group A Embodiments

Embodiment 1: A method performed by a wireless device for relaxing inter-frequency measurements, the method comprising: receiving (500) an indication that one or more frequencies should have relaxed inter-frequency measurements; and relaxing (502) the inter-frequency measurements for the one or more indicated frequencies.

Embodiment 2: The method of embodiment 1 wherein the indication that the one or more frequencies should have the relaxed inter-frequency measurements comprises an indication that the one or more frequencies have spotty coverage.

Embodiment 3: The method of any of embodiments 1 to 2 wherein the indication that the one or more frequencies should have the relaxed inter-frequency measurements comprises a single bit for each of the frequencies where one value indicates that the frequency should have the relaxed inter-frequency measurements and the other value indicates that the frequency should not have the relaxed inter-frequency measurements.

Embodiment 4: The method of any of embodiments 1 to 3 wherein relaxing the inter-frequency measurements for the one or more indicated frequencies comprises: if no cell is detected on a frequency after a first time, postponing the next measurement on that frequency for a second time which is longer than the first time.

Embodiment 5: The method of embodiment 4 wherein relaxing the inter-frequency measurements for the one or more indicated frequencies further comprises: if no cell is again detected on the frequency after the second time, again postponing the next measurement on that frequency for an even longer time.

Embodiment 6: The method of any of embodiments 1 to 5 further comprising: if the wireless device detects a suitable cell or performs cell re-selection, the wireless device reverts back to legacy measurement requirements.

Embodiment 7: The method of any of embodiments 1 to 6 wherein relaxing the inter-frequency measurements for the one or more indicated frequencies comprises: skipping a defined number of consecutive measurement gaps when measurement gaps are configured.

Embodiment 8: The method of any of embodiments 1 to 7 wherein relaxing the inter-frequency measurements for the one or more indicated frequencies comprises: if no cell is detected on a frequency after a first time, increasing Thigher_priority_search.

Embodiment 9: The method of embodiment 8 wherein relaxing the inter-frequency measurements for the one or more indicated frequencies further comprises: if no cell is again detected on the frequency, again increasing Thigher_priority_search.

Embodiment 10: The method of any of embodiments 1 to 9 wherein the indication that the one or more frequencies should have the relaxed inter-frequency measurements comprises an indication in SIB4 per inter-frequency if the frequency provides spotty coverage, and whether the wireless device may apply the relaxed inter-frequency measurements when the wireless device fails to detect any suitable cells.

Embodiment 11: The method of any of embodiments 1 to 9 wherein the indication that the one or more frequencies should have the relaxed inter-frequency measurements comprises an indication in a measurement object (such as MeasObjectNR) for the inter-frequency (such as ssbFrequency).

Embodiment 12: The method of any of the previous embodiments, further comprising: providing user data; and forwarding the user data to a host computer via the transmission to the base station.

Group B Embodiments

Embodiment 13: A method performed by a base station for relaxing inter-frequency measurements, the method comprising: determining (600) that one or more frequencies should have relaxed inter-frequency measurements; and relaxing (602) the inter-frequency measurements for the one or more indicated frequencies.

Embodiment 14: The method of embodiment 13 wherein relaxing the inter-frequency measurements for the one or more indicated frequencies comprises transmitting to a wireless device an indication that the one or more frequencies should have the relaxed inter-frequency measurements.

Embodiment 15: The method of embodiment 14 wherein the indication that the one or more frequencies should have the relaxed inter-frequency measurements comprises an indication that the one or more frequencies have spotty coverage.

Embodiment 16: The method of any of embodiments 14 to 15 wherein the indication that the one or more frequencies should have the relaxed inter-frequency measurements comprises a single bit for each of the frequencies where one value indicates that the frequency should have the relaxed inter-frequency measurements and the other value indicates that the frequency should not have the relaxed inter-frequency measurements.

Embodiment 17: The method of any of embodiments 1 to 3 wherein relaxing the inter-frequency measurements for the one or more indicated frequencies comprises:

indicating to the wireless device that if no cell is detected on a frequency after a first time, postponing the next measurement on that frequency for a second time which is longer than the first time.

Embodiment 18: The method of embodiment 17 wherein relaxing the inter-frequency measurements for the one or more indicated frequencies further comprises:

indicating to the wireless device that if no cell is again detected on the frequency after the second time, again postponing the next measurement on that frequency for an even longer time.

Embodiment 19: The method of any of embodiments 14 to 18 further comprising: indicating to the wireless device that if the wireless device detects a suitable cell or performs cell re-selection, the wireless device reverts back to legacy measurement requirements.

Embodiment 20: The method of any of embodiments 14 to 19 wherein relaxing the inter-frequency measurements for the one or more indicated frequencies comprises: indicating to the wireless device to skip a defined number of consecutive measurement gaps when measurement gaps are configured.

Embodiment 21: The method of any of embodiments 14 to 20 wherein relaxing the inter-frequency measurements for the one or more indicated frequencies comprises: indicating to the wireless device that if no cell is detected on a frequency after a first time, increasing Thigher_priority_search.

Embodiment 22: The method of embodiment 21 wherein relaxing the inter-frequency measurements for the one or more indicated frequencies further comprises: indicating to the wireless device that if no cell is again detected on the frequency, again increasing Thigher_priority_search.

Embodiment 23: The method of any of embodiments 13 to 22 wherein the indication that the one or more frequencies should have the relaxed inter-frequency measurements comprises an indication in SIB4 per inter-frequency if the frequency provides spotty coverage, and whether the wireless device may apply the relaxed inter-frequency measurements when the wireless device fails to detect any suitable cells.

Embodiment 24: The method of any of embodiments 13 to 23 wherein the indication that the one or more frequencies should have the relaxed inter-frequency measurements comprises an indication in a measurement object (such as MeasObjectNR) for the inter-frequency (such as ssbFrequency).

Embodiment 25: The method of embodiment 13 wherein relaxing the inter-frequency measurements for the one or more indicated frequencies comprises altering the measurement configuration for the one or more frequencies that should have the relaxed inter-frequency measurements.

Embodiment 26: The method of any of the previous embodiments, further comprising: obtaining user data; and forwarding the user data to a host computer or a wireless device.

Group C Embodiments

Embodiment 27: A wireless device for relaxing inter-frequency measurements, the wireless device comprising: processing circuitry configured to perform any of the steps of any of the Group A embodiments; and power supply circuitry configured to supply power to the wireless device.

Embodiment 28: A base station for relaxing inter-frequency measurements, the base station comprising: processing circuitry configured to perform any of the steps of any of the Group B embodiments; and power supply circuitry configured to supply power to the base station.

Embodiment 29: A User Equipment, UE, for relaxing inter-frequency measurements, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 30: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 31: The communication system of the previous embodiment further including the base station.

Embodiment 32: The communication system of the previous 2 embodiments, further including the UE, wherein the UE is configured to communicate with the base station.

Embodiment 33: The communication system of the previous 3 embodiments, wherein: the processing circuitry of the host computer is configured to execute a host application, thereby providing the user data; and the UE comprises processing circuitry configured to execute a client application associated with the host application.

Embodiment 34: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 35: The method of the previous embodiment, further comprising, at the base station, transmitting the user data.

Embodiment 36: The method of the previous 2 embodiments, wherein the user data is provided at the host computer by executing a host application, the method further comprising, at the UE, executing a client application associated with the host application.

Embodiment 37: A User Equipment, UE, configured to communicate with a base station, the UE comprising a radio interface and processing circuitry configured to perform the method of the previous 3 embodiments.

Embodiment 38: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 39: The communication system of the previous embodiment, wherein the cellular network further includes a base station configured to communicate with the UE.

Embodiment 40: The communication system of the previous 2 embodiments, wherein: the processing circuitry of the host computer is configured to execute a host application, thereby providing the user data; and the UE's processing circuitry is configured to execute a client application associated with the host application.

Embodiment 41: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 42: The method of the previous embodiment, further comprising at the UE, receiving the user data from the base station.

Embodiment 43: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 44: The communication system of the previous embodiment, further including the UE.

Embodiment 45: The communication system of the previous 2 embodiments, further including the base station, wherein the base station comprises a radio interface configured to communicate with the UE and a communication interface configured to forward to the host computer the user data carried by a transmission from the UE to the base station.

Embodiment 46: The communication system of the previous 3 embodiments, wherein: the processing circuitry of the host computer is configured to execute a host application; and the UE's processing circuitry is configured to execute a client application associated with the host application, thereby providing the user data.

Embodiment 47: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 48: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 49: The method of the previous embodiment, further comprising, at the UE, providing the user data to the base station.

Embodiment 50: The method of the previous 2 embodiments, further comprising: at the UE, executing a client application, thereby providing the user data to be transmitted; and at the host computer, executing a host application associated with the client application.

Embodiment 51: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 52: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 53: The communication system of the previous embodiment further including the base station.

Embodiment 54: The communication system of the previous 2 embodiments, further including the UE, wherein the UE is configured to communicate with the base station.

Embodiment 55: The communication system of the previous 3 embodiments, wherein: the processing circuitry of the host computer is configured to execute a host application; and the UE is configured to execute a client application associated with the host application, thereby providing the user data to be received by the host computer.

Embodiment 56: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 57: The method of the previous embodiment, further comprising at the base station, receiving the user data from the UE.

Embodiment 58: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
AF Application Function
AMF Access and Mobility Function
AN Access Network
AP Access Point ASIC Application Specific Integrated Circuit
AUSF Authentication Server Function
CPU Central Processing Unit
DN Data Network
DRX Discontinuous Reception
DSP Digital Signal Processor
eMBB Enhanced Mobile Broadband
eNB Enhanced or Evolved Node B
FPGA Field Programmable Gate Array
gNB New Radio Base Station
IE Information Element
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function
URLLC Ultra Reliable and Low Latency Communication Those skilled in the art will recognize improvements and modifications to the embodiments of the present disclosure. All such improvements and modifications are considered within the scope of the concepts disclosed herein.

What is claimed is:

1. A method performed by a wireless device for relaxing inter-frequency measurements, the method comprising:
receiving an indication that one or more frequencies should have relaxed inter-frequency measurements; and
relaxing the inter-frequency measurements for the one or more indicated frequencies, where relaxing the inter-frequency measurements for the one or more indicated frequencies comprises:
if no cell is detected on a frequency after a first time period, postponing a next measurement on that frequency for a second time period which is longer than the first time period.

2. The method of claim 1 wherein the indication that the one or more frequencies should have the relaxed inter-frequency measurements comprises an indication that the one or more frequencies have spotty coverage.

3. The method of claim 1 wherein the indication that the one or more frequencies should have the relaxed inter-frequency measurements comprises:
a single bit for each of the one or more frequencies where one value indicates that the frequency should have the relaxed inter-frequency measurements and another value indicates that the frequency should not have the relaxed inter-frequency measurements.

4. The method of claim 1 wherein relaxing the inter-frequency measurements for the one or more indicated frequencies further comprises:
if no cell is again detected on the frequency after the second time period, again postponing the next measurement on that frequency for an even longer time period.

5. The method of claim 1 further comprising:
if the wireless device detects a suitable cell or performs cell re-selection, the wireless device reverts back to legacy measurement requirements.

6. The method of claim 1 wherein relaxing the inter-frequency measurements for the one or more indicated frequencies comprises:
skipping a defined number of consecutive measurement gaps when measurement gaps are configured.

7. The method of claim 1 wherein relaxing the inter-frequency measurements for the one or more indicated frequencies comprises:
if no cell is detected on the frequency after a first time, increasing a value of $T_{higher\_priority\_search}$.

8. The method of claim 7 wherein relaxing the inter-frequency measurements for the one or more indicated frequencies further comprises:
if no cell is again detected on the frequency, again increasing the value of $T_{higher\_priority\_search}$.

9. The method of claim 1 wherein the indication that the one or more frequencies should have the relaxed inter-frequency measurements comprises:
an indication in SIB4 per inter-frequency whether the frequency provides spotty coverage, and whether the wireless device may apply the relaxed inter-frequency measurements when the wireless device fails to detect any suitable cells.

10. The method of claim 1 wherein the indication that the one or more frequencies should have the relaxed inter-frequency measurements comprises an indication in a measurement object for the inter-frequency.

11. The method of claim 10 wherein the measurement object comprises a MeasObjectNR and/or the inter-frequency comprises a ssbFrequency.

12. A method performed by a base station for relaxing inter-frequency measurements, the method comprising:
determining that one or more frequencies should have relaxed inter-frequency measurements; and
relaxing the inter-frequency measurements for the one or more indicated frequencies, wherein relaxing the inter-frequency measurements for the one or more indicated frequencies comprises:
indicating to a wireless device that if no cell is detected on a frequency after a first time period, postponing a next measurement on that frequency for a second time period which is longer than the first time period.

13. The method of claim 12 wherein relaxing the inter-frequency measurements for the one or more indicated frequencies comprises transmitting to the wireless device an indication that the one or more frequencies should have the relaxed inter-frequency measurements.

14. The method of claim 13 wherein the indication that the one or more frequencies should have the relaxed inter-frequency measurements comprises an indication that the one or more frequencies have spotty coverage.

15. The method of claim 13 wherein the indication that the one or more frequencies should have the relaxed inter-frequency measurements comprises:
a single bit for each of the one or more frequencies where one value indicates that the frequency should have the relaxed inter-frequency measurements and another value indicates that the frequency should not have the relaxed inter-frequency measurements.

16. The method of claim 13 wherein relaxing the inter-frequency measurements for the one or more indicated frequencies further comprises:
indicating to the wireless device that if no cell is again detected on the frequency after the second time period, again postponing the next measurement on that frequency for an even longer time period.

17. The method of claim 13 further comprising:
indicating to the wireless device that if the wireless device detects a suitable cell or performs cell re-selection, the wireless device reverts back to legacy measurement requirements.

18. The method of claim 13 wherein relaxing the inter-frequency measurements for the one or more indicated frequencies comprises:
indicating to the wireless device to skip a defined number of consecutive measurement gaps when measurement gaps are configured.

19. The method of claim 13 wherein relaxing the inter-frequency measurements for the one or more indicated frequencies comprises:
indicating to the wireless device that if no cell is detected on the frequency after a first time, increasing $T_{higher\_priority\_search}$.

20. The method of claim 19 wherein relaxing the inter-frequency measurements for the one or more indicated frequencies further comprises:
indicating to the wireless device that if no cell is again detected on the frequency, again increasing $T_{higher\_priority\_search}$.

21. The method of claim 12 wherein the indication that the one or more frequencies should have the relaxed inter-frequency measurements comprises:
an indication in SIB4 per inter-frequency if the frequency provides spotty coverage, and whether the wireless device may apply the relaxed inter-frequency measurements when the wireless device fails to detect any suitable cells.

22. The method of claim 12 wherein the indication that the one or more frequencies should have the relaxed inter-frequency measurements comprises an indication in a measurement object for the inter-frequency.

23. The method of claim 22 wherein the measurement object comprises a MeasObjectNR and/or the inter-frequency comprises a ssbFrequency.

24. The method of claim 12 wherein relaxing the inter-frequency measurements for the one or more indicated frequencies comprises altering a measurement configuration for the one or more frequencies that should have the relaxed inter-frequency measurements.

25. A wireless device for relaxing inter-frequency measurements, the wireless device comprising:
one or more processors; and
memory storing instructions executable by the one or more processors, whereby the wireless device is operable to:
receive an indication that one or more frequencies should have relaxed inter-frequency measurements; and
relax the inter-frequency measurements for the one or more indicated frequencies, where relaxing the inter-frequency measurements for the one or more indicated frequencies comprises the wireless device being operable to:
if no cell is detected on a frequency after a first time period, postpone a next measurement on that frequency for a second time period which is longer than the first time period.

26. A base station for relaxing inter-frequency measurements, the base station comprising:
one or more processors; and
memory comprising instructions to cause the base station to:
determine that one or more frequencies should have relaxed inter-frequency measurements; and
relax the inter-frequency measurements for the one or more indicated frequencies, where relaxing the inter-frequency measurements for the one or more indicated frequencies comprises instructions to cause the base station to:
indicate to a wireless device that if no cell is detected on a frequency after a first time period, postpone a next measurement on that frequency for a second time period which is longer than the first time period.

* * * * *